United States Patent
Sugimoto

[11] Patent Number: 5,956,880
[45] Date of Patent: Sep. 28, 1999

[54] BIRD REPELLENT APPARATUS

[75] Inventor: Hiroaki Sugimoto, Osaka, Japan

[73] Assignee: Bird Stopper Co., Ltd., Japan

[21] Appl. No.: 08/945,093

[22] PCT Filed: Feb. 17, 1997

[86] PCT No.: PCT/JP97/00409

§ 371 Date: Dec. 15, 1997

§ 102(e) Date: Dec. 15, 1997

[87] PCT Pub. No.: WO97/30585

PCT Pub. Date: Aug. 28, 1997

[30] Foreign Application Priority Data

Feb. 20, 1996 [JP] Japan ................................. 8-058433

[51] Int. Cl.$^6$ .......................... A01M 29/02; G08B 15/00; A63H 13/20
[52] U.S. Cl. .................. 43/2; 116/22 A; 446/30
[58] Field of Search .................. 43/1, 2; 116/22 A; 446/30, 31, 35, 242, 236, 247, 251, 255; 472/87

[56] References Cited

U.S. PATENT DOCUMENTS

| | | |
|---|---|---|
| D. 384,598 | 10/1997 | Park ........................................ 116/22 A |
| 3,136,544 | 6/1964 | Strayer ........................................ 446/30 |
| 3,325,940 | 6/1967 | Davis ........................................ 446/242 |
| 4,037,358 | 7/1977 | Rosenbaum ................................. 446/30 |
| 4,363,181 | 12/1982 | Hyman et al. ........................... 446/242 |
| 4,598,660 | 7/1986 | Konzak ................................. 116/22 A |
| 4,817,937 | 4/1989 | Ozeki ........................................ 446/30 |
| 5,602,523 | 2/1997 | Turchioe ................................. 116/22 A |

Primary Examiner—Robert P. Swiatek
Assistant Examiner—Elizabeth Shaw
Attorney, Agent, or Firm—Thompson Hine & Flory LLP

[57] ABSTRACT

An apparatus for flying a flying body imitating a raptor such as a hawk and an eagle to scare birds such as doves and crows to inhibit these birds from approaching. Concretely, the flying body is mounted to a hanging wire is adjusted in rotational speed and paying-out amount whereby a highly varying flying mode is realized, and a guide rail is constructed in a desired configuration to permit the flying body to be mounted to a self-propelled device housed in the guide rail or to a drive cable whereby the flying body is made to fly along the guide rail. Further, a power source of the apparatus is controlled by a timer or an illumination sensor, which acts to measure outdoor illumination, to enable the flying body to fly in conformity with a period of time, in which birds are active, so that the apparatus is made reasonable. In addition, a sensor is installed which senses approaching birds, and a sensing signal by the sensor permits the flying body to fly, so that it is possible to achieve power saving.

26 Claims, 4 Drawing Sheets

BIRD REPELLENT APPARATUS

TECHNICAL FIELD

The present invention relates to an apparatus for preventing doves and crows and the like from accessing to buildings such as an aeroplane hangar or a large warehouse to preclude damage incurred by these kinds of birds.

BACKGROUND ART

Doves, crows and other birds incur damages by their droppings. Dropping damages sometimes pose a serious trouble. In a huge building such as an aeroplane hangar, a large-scale warehouse, or a big plant, its entrance and exit have to be left open because of frequent incoming and outgoing operations of planes and transport vehicles. A bird easily enters it. Birds having a nest in the building have generally a strong attachment to it, and doves are particularly notorious for it. Even if they are frightened away, they will definitely come back again and there was no effective solution to it.

Natural enemy relationships are established among birds. For example, birds of prey such as eagles, hawks and falcons are thought of as the natural enemies of doves and crows. When the dove and crow recognize the presence of such a natural enemy nearby, they immediately fly away. If the dove and crow encounter the enemy repeatedly, they will never access the same location.

DISCLOSURE OF INVENTION

It is an object of the present invention to provide a environment, which doves and crows are unlikely to access, by taking advantage of the their natural enemy principle.

The present invention scares birds into flying away by flying a flying object having a predatory-bird-like figure. The flying object may provided with a light emission unit, an ultrasonic sound transmitter, and a sound generator, alone or in combination to increase the scaring effect of the flying object against the birds.

Flying means for the flying object comprises a suspension wire for suspending the flying object to a support, a motor, mounted on the support, for making the flying object fly around the support in a circular trajectory, a reel around which the suspension wire is wound, wherein the motor and the reel are separately controlled by control means to impart a diversity to the trajectory of the flying object.

Another flying means permits the flying object to move along a guide rail formed in a desired configuration. More specifically, the flying object is attached to a self-propelled unit running along the guide rail, or is tied to a driving cable installed within the guide rail. In the arrangement where the guide rail is used, a trolley wire may be extended in parallel with the guide rail, and power is supplied via a current collector kept in sliding contact with the trolley wire to a diversity of units including a light emission unit mounted on the self-propelled unit or the flying object.

The control means for flying the flying object around or the power supply for the trolley wire may be automatically switched on and off by using a timer or a light sensor so that the apparatus is activated in synchronization with the activity pattern of the birds.

A sensor for detecting an incoming bird may be used to activate the movement of the flying object. With this arrangement, the apparatus operates in a power saving manner.

BEST MODE FOR CARRYING OUT THE INVENTION

Figure 1:
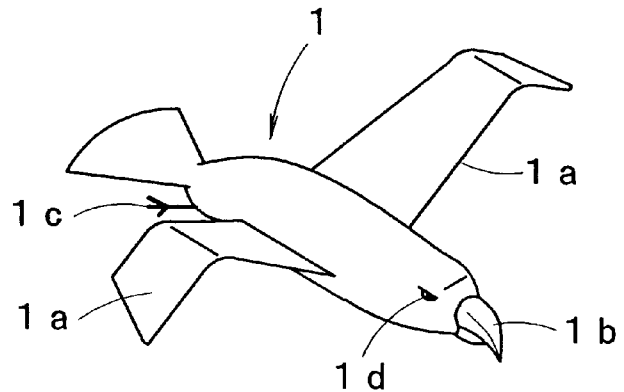
FIG. 1 is a perspective view showing an example of a flying object used in the present invention.

Referring now to the drawings, the present invention is discussed. FIG. 1 is a perspective view showing an example of a flying object used in the present invention. A flying object 1 imitates features of predators such as eagles, hawks and falcons thought of as natural enemies of the dove and crow (hereinafter referred to as birds), namely mocks large wings 1a, sharply pointed beaks 1b, and claws 1c. The flying object 1 is preferably molded of a light-weight material excellent in moldability and durability, including but not limited to plastic. A stuffed bird of prey is sometimes used which naturally exhibits an excellent scaring effect. The material of the flying object is chosen taking into consideration the frequency of use and operational environment. It is important that the flying object 1 mocks at least a bird of prey.

To scare the birds away more effectively, the flying object 1 may be provided with a light emission unit such as red light-emission diodes or bulbs at the locations corresponding to the eyes of the flying bird 1, and by continuously lighting or blinking them, scaring effect is further increased. The color of the light emission unit is not limited to red. Since the birds are generally known to avert variations in electromagnetic wave, it is useful to mount a relatively strong permanent magnet or an ultrasonic wave transmitter in the flying object 1. The scaring effect of the flying object 1 is further increased by housing in the flying object 1 a sound generator giving off a call of birds of prey. These arrangements scare the birds visually, sensitively, and audibly, and the scaring effect is maximized by combining all these. It is not a requirement that the above arrangements are installed in the flying object 1. The above arrangements are optionally combined depending on the operational environment of the apparatus of the present invention.

Discussed next is the arrangement for precluding the access of the birds by flying the flying object 1 to scare the birds away.

Figure 2:
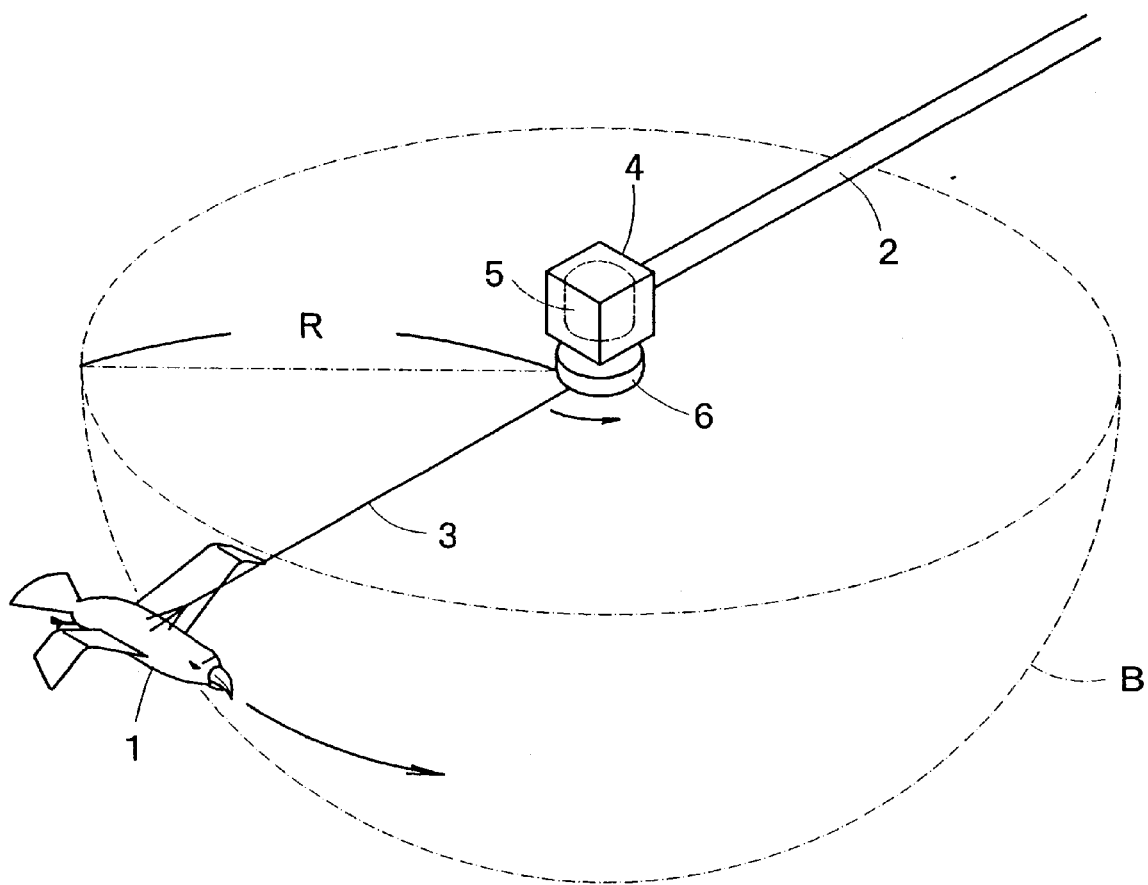
FIG. 2 is a perspective view of the circular flying motion of the flying object according t first embodiment of the present invention.

FIG. 2 shows a first embodiment of the present invention in which the flying object 1 is circled around. In the basic arrangement of the apparatus, the flying object 1 is suspended by a suspension wire 3, which is fixed to a bracket at the end of a support 2. The support 2 is secured to a building. The suspension wire 3 is preferably a highly durable wire such as a piano wire, though the material of the suspension wire 3 is not limited to it.

Arranged at the end of the support 2 are a motor 5 housed in a box 4 and a rotary body 6 integrally rotating with the motor 5. One end of the suspension wire 3 is secured to the rotary body 6. When the motor 5 rotates, the flying object 1 is circled around the axis of rotation. The rotary body 6 transmits rotation to the flying object 1. The rotary body 6 may take not only a circular disk shape as shown but any known structural shape, as long as the rotary body 6 achieves the above-described function. For example, the rotary body 6 may be an L-shaped angle. The motor 5 is controlled by control means (not shown) housed in the box 4. As the rotational speed of the motor 5 increases, the centrifugal force acting on the flying body 1 increases, raising the flying object 1 higher.

Taking advantage of this principle, by varying the rotational speed of the motor 5 by the control means, the flying object 1 is caused to pass any point on the surface of a semi-spherical body B of a radius R equal to the payout length of the suspension wire 3. The installation location of the control means is not limited to within the box 4, and may be set in a monitoring room provided for remote control purpose.

In the above arrangement, a reel (not shown) around which the suspension wire 3 is wound is contained in the box 4, the rotary body 6 or the flying body 1. Like the motor 5, the reel is controlled by the control means so that the reel-in and payout length of the suspension wire 3 are varied. More particularly, the control means adjusts the payout length of the suspension wire 3 from the reel to determine the region of fly of the flying object 1 (the size of the above-described semi-spherical body B). Alternatively, the paying out of the suspension wire 3 may be controlled by the centrifugal force acting on the flying object 1.

In the first embodiment, the flying object 1 moves freely in the flying region defined by the surface of the semi-spherical body, the diameter of which is the length of the suspension wire 3. The motor 5 and the reel are separately controlled by the control means such as a computer. The flying trajectory of the flying object 1 may simulate the flying behavior of an actual bird of prey by controlling in a regular pattern or randomly the rotational speed of the motor 5 and the reel-in rate per unit time of the suspension wire 3 by the reel. With this arrangement, the birds are prevented from being accustomed to the same flying trajectory pattern of the flying object 1 and the scaring effect of the apparatus is increased. The control means is not limited to the computer. Another means is acceptable as long as it prevents the flying trajectory from being monotonous.

Figure 3:
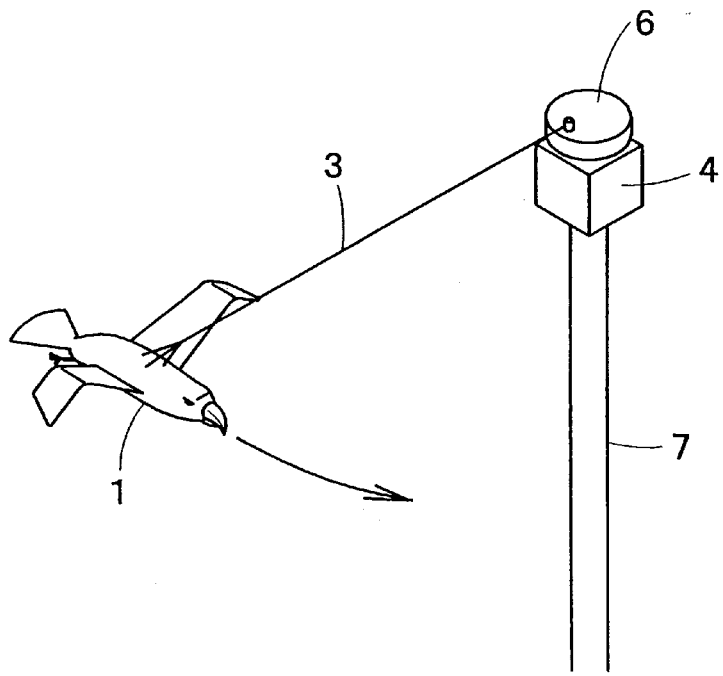
FIG. 3 is a perspective view of the circular flying motion of the flying object according to a second embodiment of the present invention.

FIG. 3 is a second embodiment for making the flying object 1 circle. The bracket-ended support 2 in the first embodiment is replaced with a mast 7. The motor 5 and rotary body 6 are mounted on the top end of the mast 7 to allow the flying object 1 to circularly fly (note that the arrangement in FIG. 2 is upside down here).

Figure 4:
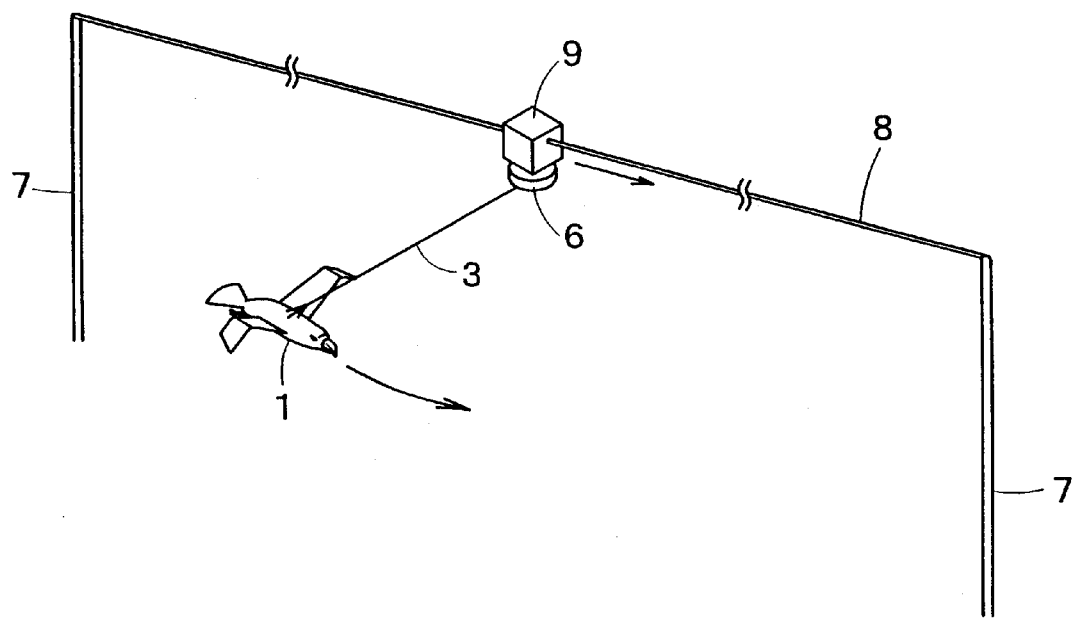
FIG. 4 is a perspective view of the circular flying motion of the flying object according to a third embodiment of the present invention.

FIG. 4 shows a third embodiment in which the flying object 1 is moved in the same manner as in the preceding. Furthermore, the third embodiment comprises a rail 8 arranged between two masts 7 to cause a unit 9 containing the motor 5 and the reel to reciprocate along the rail 8, and expands the operation area of the apparatus. In the third embodiment, the rail 8 is a finite linear one. Alternatively, the rail 8 may be looped or zigzagged surrounding a building to allow the unit 9 to run automatically. The configuration of the rail 8 may be flexibly designed to meet the area of protection from the birds, namely to match the structure and size of the building.

Figure 5:
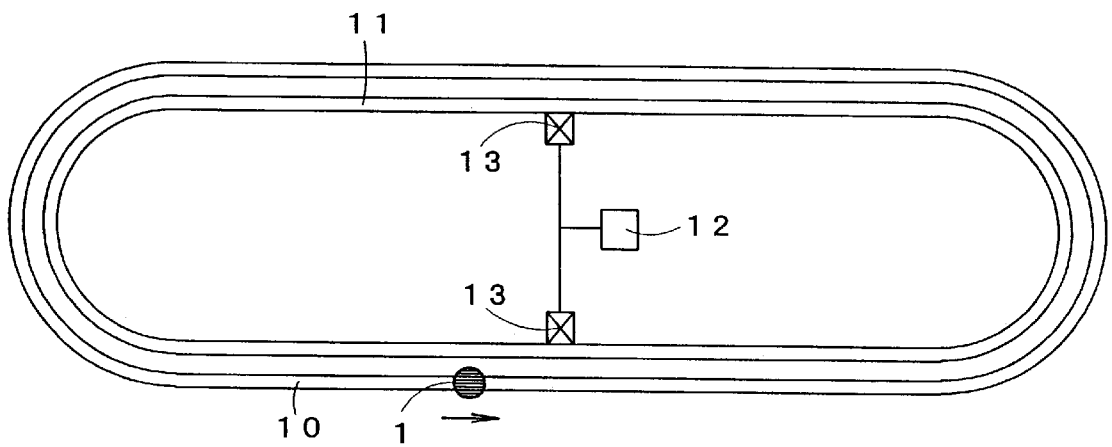
FIG. 5 is a plan view showing the arrangement in which the flying object is moved along a rail.

Referring to FIGS. 5 through 8, one embodiment of for moving the flying object 1 along the rail is discussed. Referring to FIG. 5, in this embodiment, a guide rail 10 is formed to a desired configuration, causing the flying object 1 to move along the guide rail 10 rather than to fly in a circle. A trolley (conductive) wire 11 for power supplying is arranged in parallel with the guide rail 10. These are different from the first to third embodiments. The first to third embodiments assume that the flying object 1 suspended by the suspension wire 3 flies in a circle. The size of the building is necessarily large, because it requires a sufficient space accommodating the maximum payout of the suspension wire 3. In contrast, this embodiment is suited to a relatively smaller building. Note that there is a good chance that the birds also enter a relatively smaller building. As shown in FIG. 5, a power distribution panel 12 distributes power to the trolley wire 11 via terminal boxes 13.

Figure 6:
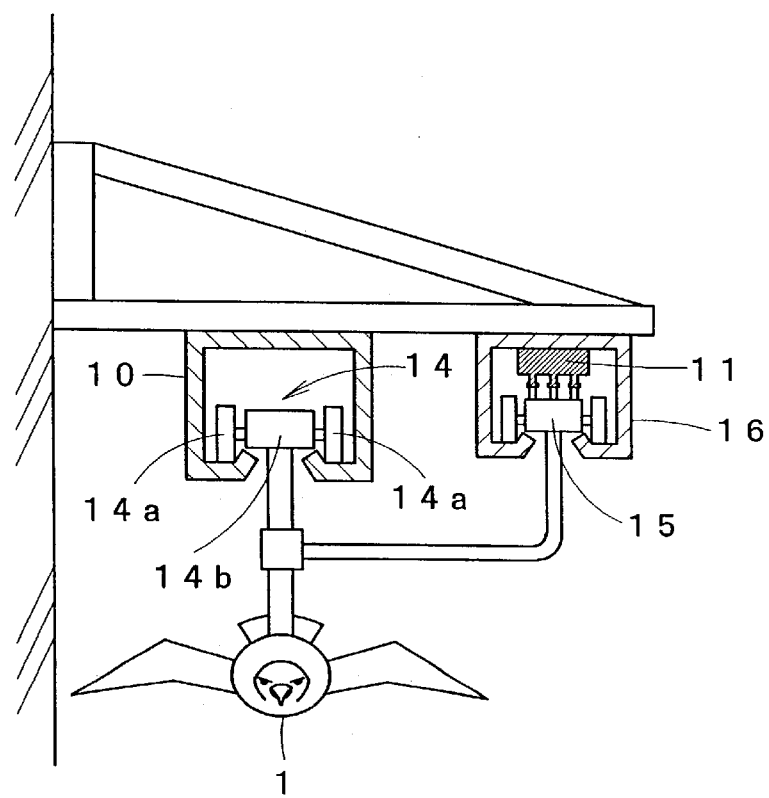
FIG. 6 is a partially cross-sectional view showing a first embodiment in which the flying object is moved along the rail.

FIG. 6 shows a first embodiment in which the flying object 1 is driven by a self-propelled unit 14 along the guide rail 10 in the arrangement shown in FIG. 5. The self-propelled unit 14 is constructed of wheels 14a and a driver 14b for the wheels 14a, and the flying object 1 is connected to the self-propelled unit 14. A current collector 15 is put into sliding contact with the trolley wire 11 arranged in parallel with the guide rail 10, and electric power is supplied via the current collector 15 and the trolley wire 11 to the light emission unit, ultrasonic sound transmitter, sound generator and the like mounted on the driver 14b of the self-propelled unit 14 or the flying object 1. The trolley wire 11 is extended in a duct 6 to assure safety, protecting persons against electric shock.

Figure 7:
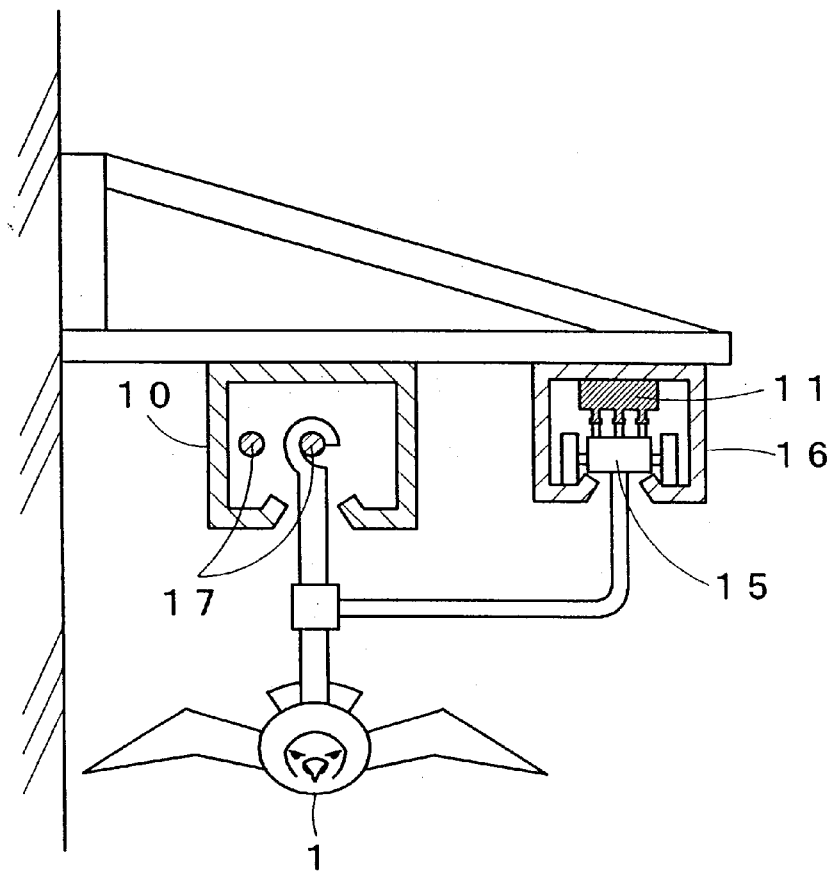
FIG. 7 is a partially cross-sectional view showing a second embodiment in which the flying object is moved along the rail.

FIG. 7 shows a second embodiment in which the flying object 1 is driven by a driving cable 17 along the guide rail 10. In the guide rail 10, the driving cable 17 is bent and supported by a pulley (not shown), and suspends the flying object 1, and is engaged with a driving unit (not shown) such as a motor to move the flying object 1 along the guide rail 10. In this embodiment as well, the trolley wire 11 is arranged in parallel with the guide rail 10, and electric power is supplied to the light emission unit or the like via the trolley wire 11 and the current collector 15. The object of the present invention will be achieved even if both the trolley wire 11 and the driving cable 17 are housed in the same guide rail 10.

Figure 8:
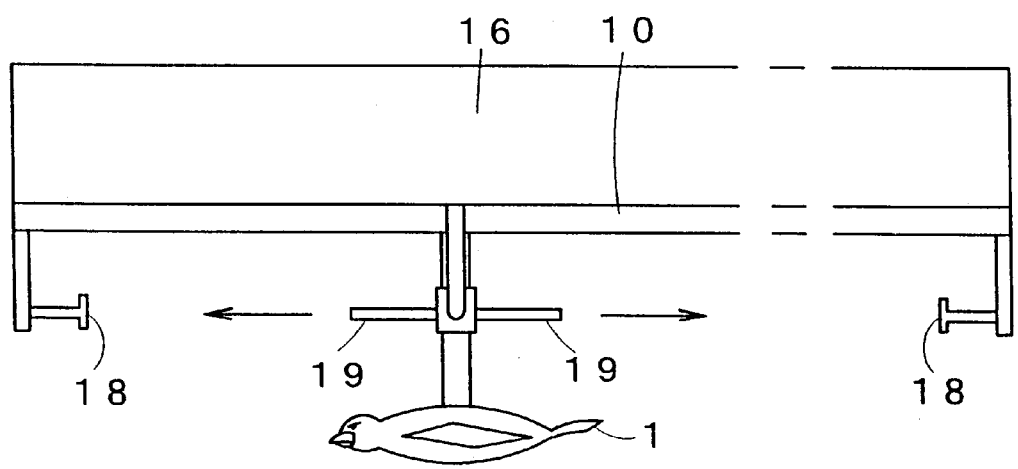
FIG. 8 is a side view showing the arrangement in which the flying object is reversed in the direction of its motion.

In the embodiments shown in FIGS. 5–7, the guide rail is constructed in an endless configuration, where the flying object 1 is moved in a single direction only. Alternatively, a finite length guide rail 10 may be used as shown in FIG. 8. In this case, reversal switches 18 are respectively provided on both ends of the guide rail 10. The flying object 1 is provided with switch levers 19 corresponding to the reversal switches 18. When the switch lever 19 touches the reversal switch 18 as the flying object 1 moves, the direction of movement of the driver 14b of the self-propelled unit 14 or the driving cable 17 is reversed. The direction of movement of the flying object 1 is thus switched. Namely, the flying object 1 is reciprocated along the guide rail 10.

Since vision of most types of the birds drops at night, their nocturnal activity is almost zero. Taking advantage of this trait, the apparatus of the present invention is provided with a timer or a light sensor. The signal output from them is used to turn on and off the electric power to the control means (including the motor 5 and the reel) and the power distribution panel 12. More specifically, the sunrise and sunset times are set in the timer, which automatically controls the power switch to on and off at set times. When the light sensor is employed, a reference brightness is preset in the light sensor and power is automatically turned on when outdoor brightness level exceeds the reference brightness; when outdoor brightness level drops below the reference brightness, power is automatically turned off. In this way the apparatus of the present invention is effectively driven in synchronization with the activity pattern of the birds.

To drive the apparatus of the present invention in a power saving and efficient manner, an infrared sensor may be combined with the timer and light sensor. The infrared sensor is installed at the intrusion course of the birds, and is connected to the control means for circling the flying object 1 in preceding embodiments, or the self-propelled unit, the driver or the power distribution panel 12 in preceding embodiments equipped with the guide rail. With power on and the apparatus on standby, the driving means of the flying object 1 stay motionless while no bird comes in. The flying object 1 starts moving in response to the signal from the sensor. The power consumption of the apparatus is thus reduced.

What is claimed is:

1. A bird repellent apparatus comprising a flying object having a figure imitating a bird of prey, a guide rail having a desired configuration, a trolley wire extending parallel with the guide rail, a self-propelled unit which runs along the guide rail and to which the flying object is mounted, and a current collector in sliding contact with the trolley wire for supplying electric power to the self-propelled unit.

2. The bird repellent apparatus of claim 1 further comprising a light emission unit, an ultrasonic sound transmitter and a sound generator alone or in combination in the flying object.

3. The bird repellent apparatus of claim 2 further comprising a timer for controlling the operation of the apparatus.

4. The bird repellent apparatus of claim 3 further comprising a sensor for detecting an incoming bird, wherein the flying object is moved in response to a signal from the sensor.

5. The bird repellent apparatus of claim 2 further comprising a light sensor for controlling the operation of the apparatus.

6. The bird repellent apparatus of claim 5 further comprising a sensor for detecting an incoming bird, wherein the flying object is moved in response to a signal from the sensor.

7. The bird repellent apparatus of claim 2 further comprising a sensor for detecting an incoming bird, wherein the flying object is moved in response to a signal from the sensor.

8. The bird repellent apparatus of claim 1 further comprising a timer for controlling the operation of the apparatus.

9. The bird repellent apparatus of claim 1 further comprising a light sensor for controlling the operation of the apparatus.

10. The bird repellent apparatus of claim 1 further comprising a sensor for detecting an incoming bird, wherein the flying object is moved in response to a signal from the sensor.

11. A bird repellent apparatus comprising a flying object having a figure imitating a bird of prey, a guide rail having a desired configuration, a trolley wire extending in parallel with the guide rail, a driving cable which is housed in the guide rail and to which the flying object is attached, a self-propelled unit to which the flying object is attached, and a current collector in sliding contact with the trolley wire for supplying electric power to the self-propelled unit.

12. The bird repellent apparatus of claim 11 further comprising a light emission unit, an ultrasonic sound transmitter and a sound generator alone or in combination in the flying object.

13. The bird repellent apparatus of claim 12 further comprising a timer for controlling the operation of the apparatus.

14. The bird repellent apparatus of claim 13 further comprising a sensor for detecting an incoming bird, wherein the flying object is moved in response to a signal from the sensor.

15. The bird repellent apparatus of claim 12 further comprising a light sensor for controlling the operation of the apparatus.

16. The bird repellent apparatus of claim 15 further comprising a sensor for detecting an incoming bird, wherein the flying object is moved in response to a signal from the sensor.

17. The bird repellent apparatus of claim 12 further comprising a sensor for detecting an incoming bird, wherein the flying object is moved in response to a signal from the sensor.

18. The bird repellent apparatus of claim 11 further comprising a timer for controlling the operation of the apparatus.

19. The bird repellent apparatus of claim 11 further comprising a light sensor for controlling the operation of the apparatus.

20. The bird repellent apparatus of claim 11 further comprising a sensor for detecting an incoming bird, wherein the flying object is moved in response to a signal from the sensor.

21. A bird repellent apparatus comprising a flying object having a figure imitating a bird of prey, a support for suspending the flying object by a suspension wire, a motor for flying the flying object in a circular trajectory by the support and the suspension wire, a reel around which the suspension wire is wound, a control means for controlling separately the motor and the reel, a light emission unit, an ultrasonic sound transmitter and a sound generator alone or in combination with the flying object, a timer for controlling the operation of the apparatus, and a sensor for detecting an incoming bird, wherein the flying object is moved in response to a signal from the sensor.

22. A bird repellent apparatus comprising a flying object having a figure imitating a bird of prey, a support for suspending the flying object by a suspension wire, a motor for flying the flying object in a circular trajectory by the support and the suspension wire, a reel around which the suspension wire is wound, a control means for controlling separately the motor and the reel, a light emission unit, an ultrasonic sound transmitter and a sound generator alone or in combination with the flying object, and a light sensor for controlling the apparatus.

23. A bird repellent apparatus of claim 22 further comprising a sensor for detecting an incoming bird, wherein the flying object is moved in response to a signal from the sensor.

24. A bird repellent apparatus comprising a flying object having a figure imitating a bird of prey, a support for suspending the flying object by a suspension wire, a motor for flying the flying object in a circular trajectory by the support and the suspension wire, a reel around which the suspension wire is wound, a control means for controlling separately the motor and the reel, a light emission unit, an ultrasonic sound transmitter and a sound generator alone or in combination with the flying object, and a sensor for detecting an incoming bird, wherein the flying object is moved in response to a signal from the sensor.

25. A bird repellent apparatus comprising a flying object having a figure imitating a bird of prey, a support for suspending the flying object by a suspension wire, a motor for flying the flying object in a circular trajectory by the support and the suspension wire, a reel around which the suspension wire is wound, a control means for controlling separately the motor and the reel, and a light sensor for controlling the operation of the apparatus.

26. A bird repellent apparatus comprising a flying object having a figure imitating a bird of prey, a support for suspending the flying object by a suspension wire, a motor for flying the flying object in a circular trajectory by the support and the suspension wire, a reel around which the suspension wire is wound, a control means for controlling separately the motor and the reel, and a sensor for detecting an incoming bird, wherein the flying object is moved in response to a signal from the sensor.

* * * * *